United States Patent
Rühl

[19]
[11] Patent Number: 6,108,631
[45] Date of Patent: Aug. 22, 2000

[54] INPUT SYSTEM FOR AT LEAST LOCATION AND/OR STREET NAMES

[75] Inventor: Hans-Wilhelm Rühl, Solms, Germany

[73] Assignee: U.S. Philips Corporation, New York, N.Y.

[21] Appl. No.: 09/156,709

[22] Filed: Sep. 18, 1998

[30] Foreign Application Priority Data

Sep. 24, 1997 [DE] Germany .......................... 197 42 054

[51] Int. Cl.$^7$ .............................. G10L 3/00; G08G 1/09; G08G 1/133
[52] U.S. Cl. .......................... 704/270; 340/989; 701/201; 704/275
[58] Field of Search ................................... 704/270, 275; 701/200, 201, 202, 208, 210, 211; 340/988, 990, 989

[56] References Cited

U.S. PATENT DOCUMENTS

| | | | |
|---|---|---|---|
| 5,197,009 | 3/1993 | Hoffman, Jr. et al. ................. | 701/200 |
| 5,274,560 | 12/1993 | LaRue ..................... | 701/202 |
| 5,528,501 | 6/1996 | Hanson .................... | 701/200 |
| 5,630,123 | 5/1997 | Hogge ..................... | 707/101 |
| 5,682,525 | 10/1997 | Bouve et al. .............. | 707/104 |
| 5,754,430 | 5/1998 | Sawada ................... | 340/990 |
| 5,754,972 | 5/1998 | Baker et al. .............. | 704/251 |
| 5,761,640 | 6/1998 | Kalyanswamy et al. ................ | 704/260 |
| 5,793,631 | 8/1998 | Ito et al. .................... | 701/211 |
| 5,794,243 | 8/1998 | Alexander, III et al. ................ | 707/205 |

OTHER PUBLICATIONS

"Carin 520" System, Philips Car Systems, Nov. 1996.

*Primary Examiner*—David R. Hudspeth
*Assistant Examiner*—Martin Lerner
*Attorney, Agent, or Firm*—Anne E. Barschall

[57] ABSTRACT

The invention relates to an input system for at least location and/or street names, including an input device, a data source arrangement which contains at least one list of locations and/or streets, and a control device which is arranged to search location or street names, entered via the input device, in a list of locations or streets in the data source arrangement. In order to simplify the input of location and/or street names, the data source arrangement contains not only a first list of locations and/or streets with alphabetically sorted location and/or street names, but also a second list of locations and/or streets with location and/or street names sorted on the basis of a frequency criterion. A speech input system of the input device conducts input in the form of speech to the control device. The control device is arranged to perform a sequential search for a location or street name, entered in the form of speech, as from the beginning of the second list of locations and/or streets.

12 Claims, 1 Drawing Sheet

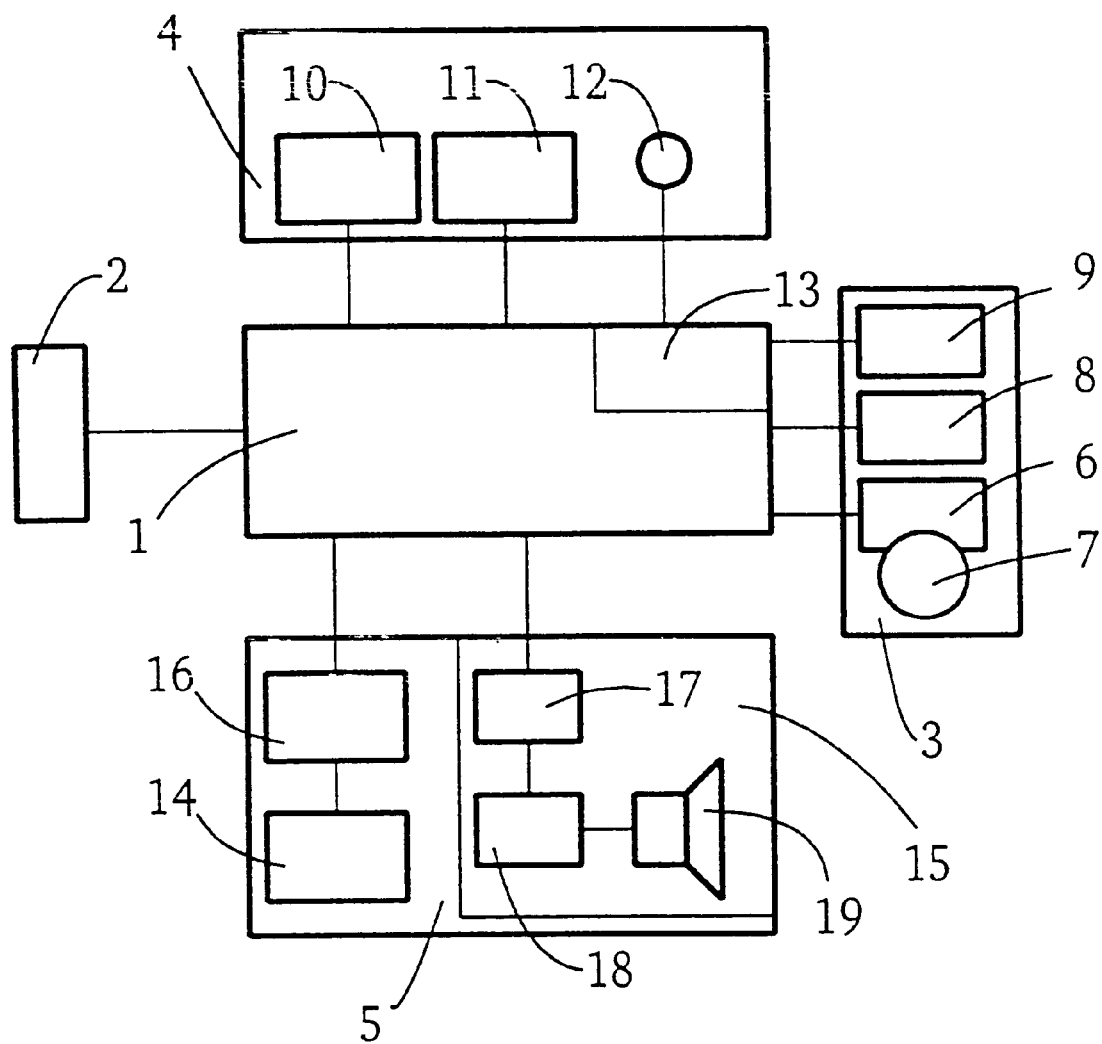

INPUT SYSTEM FOR AT LEAST LOCATION AND/OR STREET NAMES

The invention relates to an input system for at least location and/or street names, including an input device, a data source arrangement which contains at least one list of locations and/or streets, and a control device which is arranged to search location or street names, entered via the input device, in a list of locations or streets in the data source arrangement.

For example in a navigation system an input system of this kind is used to enter a destination point. The input system includes an input device, for example a keyboard, a trackball etc. The keyboard may also form part of a remote control. A navigation system of this kind is, for example the "Carin 520" system described in a Philips Car Systems publication dated November 1996. The keyboard does not comprise alphanumerical keys, but a co-ordinate input system which consists of four direction keys and one acknowledge key. It is used, for example to enter the location of a destination point by successively selecting letters on the display of the navigation system by means of a cursor which is also reproduced thereon. For example, after a location has been entered, a control device of the navigation system searches a CD-ROM, forming part of a data source device and containing inter alia an alphanumerically sorted list of locations and streets, for the location entered; this search is performed by sequentially searching the alphabetically sorted list of locations as from its beginning.

It is an object of the invention to provide an input system which enables simpler entry of location and/or street names.

The object of the invention is achieved by means of an input system of the kind set forth which is characterized in that the data source arrangement contains, in addition to a first list of locations and/or streets with alphabetically sorted names of locations and/or streets, at least one second list of locations and/or streets with names of locations and/or streets sorted on the basis of a frequency criterion, that the second lists of locations and/or streets contain at least a part of the names of locations and/or streets of the first list of locations and/or streets, that the input device includes a speech input system which is arranged to conduct entries in speech to the control device, and that the control device is arranged to conduct first of all a sequential search for a name of a location or a street, entered in the form of speech, as from the beginning of the second list of locations or streets.

The input system according to the invention can be used, for example in a navigation system, a telephone information system, a computer application etc. The data source arrangement, for example consisting of a CD-ROM deck with a CD-ROM, not only contains a first, alphabetically sorted list of locations and/or streets, but also at least one further list of locations and/or streets which is sorted according to a frequency criterion. For example, the second list of locations may be sorted according to the number of inhabitants of the locations. The second list of locations or streets may also be stored in a further, internal or external, memory which then forms part of the data source arrangement. The input device according to the invention includes a speech input system which conducts the location or street names, entered in the form of speech by a user, to the control device. The control device performs a speech recognition operation and compares the recognized, spoken location or street name with the location or street names contained in the second list of locations or streets. Because the second list of locations and/or streets is sorted according to a frequency criterion, it is likely that the location or street name searched is listed at the beginning of the second list of locations or streets, so that the search in the second list of locations or streets is in most cases faster than that in the first list of locations or streets.

As has already been stated, the input system may form part of a navigation system. The search for, for example a location name in the first list of locations in a navigation system according to the state of the art may possibly require several minutes when entries are made in the form of speech. This is not acceptable to the user. In order to ensure that in most cases the user is not faced with long waiting times, according to the invention a search is made in the second list of locations or streets instead of in the first list. In most cases the user will receive a result shortly after the speech input.

The frequency criterion can be selected not only as the number of inhabitants of a location or the number of persons living in a street, but also as a frequency of search of locations or streets which is based on empirical values. Furthermore, a list of locations or streets may be sorted according to suffixes; for example, the location names having given last syllables which occur most frequently (for example, " . . . stadt") are stated at the beginning of such a list of locations or streets. A further frequency criterion may be formed by a prefix, the number of syllables or a given property of the location or street names. One property is, for example the spelling of a location or a street, since it can be written as one or more words, with a hyphen, etc.

The search for a recognized spoken location or street name can be performed in several steps. For example, when a location formed by a large city (for example, "Hamburg") is searched and the second list of locations is sorted according to the number of inhabitants, the recognized name will be output practically directly. During a first step the search is configured so that a search is conducted in a first sub-set of the second list of locations or streets where the control device is arranged to search a name input in the form of speech. The search is in a first sub-set of the second list. The control device is also arranged to output that location or street name contained in the first sub-set which is most similar to the recognized spoken one. The first sub-set contains the location or street names from the beginning of the second list. The first sub-set is proportioned so that a search can be performed practically in real time.

If the relevant location or street name is not found, a search is performed in a second sub-set during a second step. Generally speaking, the second sub-set contains the remaining location or street names of the second list of locations or streets. The third search step becomes necessary when the search in the second step has not produced a result either. In that case recourse can be made either to a spoken entry in the form of letters or to a third list of locations or streets.

After a search operation in the first, the second or the third list of locations or streets and during a subsequent dialog with a user, the control device may already start a further search operation in the background.

An embodiment of the invention will be described in detail hereinafter with reference to the Figure. The Figure shows a block diagram of a navigation system for vehicles.

FIG. 1 shows a block diagram of an embodiment of a navigation system for vehicles. The navigation system includes a control device 1, a measuring device 2, a data source arrangement 3, an input device 4 and an output device 5. The control device 1 may include, for example a microprocessor which performs inter alia the navigation calculations and is coupled to at least one read-only memory (ROM), for example in order to execute a program, and to a random-access memory (RAM) for storing data during operation. The measuring device 2 supplies the control device 1 with data and includes, for example a tachometer, an electronic compass and a GPS (GPS=Global Positioning System) receiving unit. The measuring device may also include wheel sensors which supply the control device 1 with direction and distance data from the left and right front or rear wheels of the vehicle. The direction and distance data are determined otherwise from the signals output by the tachometer and the electronic compass. On the basis of satellite data received the GPS receiving unit calculates the instantaneous position of the vehicle and applies the calculated position data to the control device 1. The position data supplied by the GPS receiving unit have an inaccuracy of up to 100 meters.

The data source arrangement 3 includes at least one device for applying digitally encoded navigation data from a navigation data memory to the control device 1. Such a device may be, for example a CD-ROM deck 6 which fetches data concerning a given region (for example, Germany) from a CD-ROM 7 (navigation data memory). The data source arrangement 3 may also include an RDS-TMC receiver 8 (RDS=Radio Data System, TMC=Traffic Message Channel) or a GSM module 9 (GSM=Global System for Mobile Communication) which receive digitally encoded traffic messages for supply to the control device 1. The GSM module can also be used, for example for telephone conversations.

The input device 4 includes a keyboard 10, possibly a track ball 11, and a microphone 12. A user can make entries by hand via the keyboard 10 and/or the track ball 11 and/or by speech via the microphone 12. The keyboard 10 may also form part of a remote control. The entries made via the input device 4 by a user (for example, a driver) of the navigation system are also applied to the control device 1. The speech entries made via the microphone 12 are applied to a speech recognition device 13 which forms part of the control device 1. The speech recognition device 13 consists, for example of a signal processor with peripheral elements such as, for example at least one memory. The signal processor operates on the basis of a software module for speech recognition which is stored in a memory. In addition to the speech recognition device 13, the control device includes at least one further processor component with relevant peripheral elements.

The output device 5 may include a display device 14 and a speech output circuit 15. A drive circuit 16, which is also included in the output device 5, serves to drive the display device 14. The speech output circuit also includes, for example a speech synthesizer circuit 17, an amplifier 18 and a loudspeaker 19.

The control device 1 plans a route between at least two points (start and destination point). Prior to the start of driving, the user (for example, the driver) has input at least the destination point via the input device 4. The data input is generally also output by the output device 5 so as to be checked by the user. During the drive the driver receives acoustic or optical instructions from the control device 1, via the output device 5. In order to carry out, for example the planning of the route and to issue the instructions, the control device 1 utilizes several software modules. On the basis of the data delivered by the measuring device 2 (position, direction and distance data) and the data supplied by the data source arrangement 3, the control device 1 calculates, by way of a software module for position determination, the relevant position point of the vehicle at the beginning of and during the drive. A further module for route planning calculates the respective route to be followed to the relevant destination point on the basis of the position point, output by the software module for position determination, and the destination point. Traffic messages can also be taken into account, for example in order to advise the driver to avoid a traffic back-up. A software module for route indication receives the relevant position point from the software module for position determination, several route indications from the software module for route planning, and possibly also navigation data from the data source arrangement 3. The software module for route indication generates control data for the speech output and for the visual display of instructions. It is also possible to reproduce a part of a map with the relevant position indication on the display device 14.

The control device 1 performs a menu-controlled dialog with a user. For example, a main menu displayed on the display device 4 includes the following menu items:

| | |
|---|---|
| 1) destination input | 4) destination guiding |
| 2) map | 5) adjustments |
| 3) position. | |

A menu item is selected, for example by means of a co-ordinate input system which forms part of the keyboard 10. Such a co-ordinate input system may consist, for example of four direction keys and an acknowledge key or a track ball. For example, the position of a cursor or another graphic symbol (for example, a bar chart) on the display device 14 can be changed by actuation of a direction key. When a menu item has been accentuated, for example graphically, by means of the direction key, an action takes place after actuation 9 of the acknowledge key.

At the beginning of a drive generally first a destination will be entered. After selection of the menu item "destination input" in the main menu, first a location name must be entered. To this end, in the sub-menu "destination input", comprising, for example the menu items

| | |
|---|---|
| 1) location | 6) destination input map |
| 2) street | 7) address book |
| 3) erase destination | 8) new address |
| 5) destination guiding | 9) back to main menu |
| 4) information on destination location, | | the menu item "location" is selected. On the display device 14, for example letters are then displayed and the menu items "interrupt", "erase", "blank" (for blank character), "OK" etc. Using the co-ordinate input system, the location name is selected one letter after the other. When the user has completely or partly terminated the input of the location name, he or she actuates the menu item "OK". The control device 1 checks whether the location name partly or completely entered by the user can be unambiguously found on the CD-ROM 7. If the location name is not present, the user is informed accordingly so that he or she can enter a different name. If the entry is ambiguous, a list of location names is reproduced on the display device 14, enabling the user to select the desired location name therefrom.

After the selection of the location name, a further menu with letters and the menu items "interrupt", "erase", "blank" (for blank character), "OK" etc. is displayed on the display device 14 in order to select of a street name. The street name is entered in the same way as the location name.

If the street name is not known, the destination can be entered in a different manner after the selection of the location name. After selection of the menu item "destination input map", the destination can be entered by means of a map displayed on the display device 14. A cursor superposed on the map with a large scale can then first select the destination area coarsely, after which the scale of the map can be reduced step by step until the desired destination point has been found.

The input of the destination point after the selection of the location name can also be performed by means of a configuration which indicates given categories of destination. In that case the menu item "information on destination location" must be selected in the sub-menu "destination input". After selection of this menu item, a configuration with different categories is displayed on the display device 14. These categories may be, for example hotels, restaurants, points of interest, parking places, gas stations, railway stations or museums. After selection of a category, a further configuration with different selection possibilities within the category is displayed. For example, in the category "hotels" a given hotel can be selected as the destination point.

It is also possible to access an address book in which personal destination points are stored; accessing then takes place by selection of the menu item "address book". A new destination point can be entered via the menu item "new address". The entry for the address book is performed as described for entering the location and street name.

A location and street name entered, for example as a destination point, is erased by means of the menu item "erase destination". In order to enable the control device 1 to perform route planning after the destination point has been entered, the user must select the menu item "destination guiding". The display device 14 then changes over to the sub-menu "destination guiding" in which different types of display are offered (for example, map display). The display device 14 may also display further menu items which will not be elaborated herein for the sake of clarity.

The entry of names and the selection of a menu can be performed not only via the keyboard but also in a speech-controlled manner by means of the microphone 12 and the speech recognition device 13. Before making a speech entry, the user must actuate a key which activates the speech input additionally to the keyboard input. The control device 1 outputs an acoustic acknowledgement via the speech output circuit in order to acknowledge the activation of the speech input. For example, the speech output circuit outputs "destination input" or a signal tone. Thereafter, the user can use, for example given, predetermined commands in order to address given menu items or to enter data.

After, for example the speech output circuit has output "destination input" under the control of the control device 1, the user must speak the command "destination input location" or "location" in order to indicate the location of a destination point. The speech output circuit then requests the user to state the location: "please state location." In reply the user can then enter the destination location in speech. For example, the user answers: "Essen".

As in the case of data input by means of the co-ordinate input system of the keyboard, a data can also be input by speaking individual characters (for example, letters and numbers). Such an input may be possible or necessary when the control device 1, for example cannot attribute the spoken input of a completely spoken word. As an alternative for the input of the spoken location name, the user may also enter a spoken telephone area code or zip code. The CD-ROM 7 then stores not only the location names but also zip codes and/or telephone area codes. In addition to or instead of the input of the spoken location name, it may be necessary to spell the location name.

Furthermore, during a dialog with the navigation system the user can also enter the commands "Yes" or "No" so as to answer a question, "repeat" in order to repeat the last announcement, "help" or "information" in order to call for information, for example concerning the operation of the navigation system, "interrupt" or "return" so as to terminate a data input or to return to a higher-order menu, "correction" so as to change data elements and "erase" so as to erase data elements. The spoken data inputs not only trigger announcements, but also lead to changes on the display device 14. For example, after the announcement of a menu item, a sub-menu is reproduced on the display device 14. As has already been described for the input via the keyboard, the location of the destination point is again entered first in the case of speech input. It is to be noted that, for example the CD-ROM 7 for a region may contain more than 20,000 location names. For example, the CD-ROM 7 for the region or the country "Germany" comprises inter alia a first, alphabetically sorted list of locations with nowadays approximately 26,000 names of locations. A complete search for a location name in the entire list of locations may require several minutes in state of the art navigation systems. In order to accelerate the search for a location name, the CD-ROM 7 contains at least one second list of locations which contains a part of the location names of the first list of locations. The second list of locations is sorted on the basis of a frequency criterion. The latter may be the location names most frequently used. These are to be understood to be locations with the most inhabitants in a country or region. The second list of locations is sorted according to number of inhabitants of a location. This means that the large cities of the country "Germany" are stated at the beginning of the second list of locations. For the country "Germany", for example up to 10,000 location names may be contained in the second list of locations.

After the speech recognition device 13 has analyzed a speech input, the recognized spoken location name is compared, in the control device 1, with the location names supplied by the second list of locations. This comparison could also be performed in the speech recognition device 13 which, as has already been stated, forms part of the control device 1. During a first step, the control device evaluates a first sub-set of the location names of the second list of locations and applies that location name to the output device 5 which is most similar to the recognized, spoken location name. The search then commences at the beginning of the second list of locations, i.e. the first sub-set contains the locations with the largest number of inhabitants. The number of location names to be evaluated during the first step is dependent on the capacity of notably the control device 1 and the speech recognition device 13. The first sub-set of the second list of locations is proportioned so that after the speech entry, the user receives a first result in real time, i.e. without unacceptable waiting times. In order to enable real-time processing in contemporary navigation systems, the first sub-set contains approximately 200 location names.

If the location name found by the navigation system does not correspond to the spoken location name, so that the location name is not included in the first sub-set, during a second step a search is performed in a second sub-set of the second list of locations which does not contain location names of the first sub-set. The second sub-set usually contains the remaining data of the second list of locations. The second sub-set is searched on the basis of the same criterion as the first sub-set. The sequence of the search in the second sub-set is also dependent on the number of inhabitants of the location. The search in the second sub-set is not performed in real time, because the second sub-set contains a much larger number of names of locations than the first sub-set.

The result of the second step consists of one or more location names. These location names are reproduced, together with a number or another identifier, on the display device 14 and/or are output via the speech output circuit 15. During the search for the location names during the second step, any errors in the speech recognition are taken into account in that a plurality of similarly sounding location names is output. On the basis of the number or another identifier the user can then select the correct location name from the list of location names found during the second step. If the destination point was not found during the second step, during a third step the user is requested to provide further information so as to find the correct location name. The user may be requested, for example to spell the initial letters of the location name searched. In this case the search for the location name is performed in the first list of locations.

The use of a second list of locations and the request to input further information after the search in the second list of locations serve to prevent excessive waiting times for the user. In order to determine the location name, for example the following dialog could occur:

1. announcement: "which location?"
2. user: "<location >"
3. announcement: "like to go to <location name from first sub-set of the second list of locations>?"
4. user:
   a) "yes" [end]
   b) "no" [to point 5]
5. announcement: "are you going to one of the indicated locations? If so, indicate the corresponding number."
6. user:
   a) "<number 1 . . . 8>" [end]
   b) "no" [to point 7]
7. announcement: "please spell the beginning of the location name."
8. user: "<some initial letters of the location name>"
9. announcement "please wait for the reproduction of the stated location. Subsequently, please indicate the corresponding number."
10. user: "<number 1 . . . 8>".

After the navigation system has asked in which location the destination point is situated (point 1) and the user has answered (point 2), the control device 1 searches for the location name in the first sub-set of the second list of locations. The recognized, spoken location name is then mapped on the most similar location name of the first sub-set. For example, the location "Hammermünhle" which is not present in the first location short list is searched and the location name "Hamburg" is output, because the sound of these two location names is most similar. When the control device 1 has found the correct location name, the user will answer "yes" (point 4a) and the search is ended. In the other case (point 4b), the user answers "no".

During the first step, in which the most similar location name is output to the user and the user confirms or rejects this location name, the control device 1 can already search further in the second sub-set of the second list of locations during a second step. Alternatively, this search can also be performed only after termination of the first step. The resultant waiting time, however, must remain acceptable to the user.

The result of the second step consists at least of a further location name which is output via the output device 5. Generally speaking, however, a plurality of location names of the second sub-set are displayed on the display device 14, together with assigned numbers. For example, the following location names could appear on the display device 14:

1) Hameln
2) Hamm
3) Hammelburg
4) Hammer

Thus, a plurality of location names from the second sub-set is output on the display device 14, which location names are most similar to the location name searched; the user is requested to state the number at which the location name searched is listed (point 5).

If the location name searched is listed, the user states the relevant number and the search is terminated (point 6a). If the user answers "no" (point 6b), the user is requested to state some initial letters of the location name searched (point 7). The user spells, for example the first five letters of the location name (point 8). After spelling, the user is informed that the search will necessitate a waiting period.

The recognition of spoken letters is not reliable. Therefore, the speech ecognition device 13 does not produce each time a single recognized spoken letter, but for each spoken letter a plurality of recognition alternatives, together with recognition probabilities. This information is used by the control device 1 so as to make a preselection from the first list of locations, which preselection is applied to the speech recognition device 13. Consequently, the speech recognition device 13 need compare only the location names selected by the control device 1 with the location names spoken, so that it can make a fast and reliable decision.

An alternative procedure would be for the control device 1 to ask the user each time whether the letter has been correctly recognized. During the questioning and answering by the user at the same time a background process can be executed in the control device 1, which background process selects the relevant location names which commence with the relevant letters or which succeed the initial letters. Those location names in the overall list which have the initial letters stated by the user are either provided with a number and displayed on the display device 14 or can be applied to the speech recognition device 13 for a further decision as described above. The location names determined can be displayed on the display device 14 as follows:

1) Hammerhaus
2) Hammerleubsdorf
3) Hammermünhle bei Bad Duben
4) Hammermünhle bei Selters
5) Hammermünhle bei Westerburg
6) Hammersbach
7) Hammersfeld
8) Hammerstadt The user can subsequently characterize the location searched by stating the relevant number (point 10), thus terminating the search. For example, the user states the number 4 for the location "Hammersmünhle bei Selters".

In the above dialog it is not stated that a user can also make a correction or terminate each dialog. For example, when the commands "correction" or "interrupt" are spoken by the user during an input operation, either a return to the previous step is made or the entire input procedure is interrupted. This also holds for the dialogs hereinafter.

After the location name of the destination point has been searched, the navigation system subsequently asks for the street of the destination point. In the case of small locations, the control device 1 will find the street searched practically immediately in a first list of streets, because the number of entries is so small. In the case of a search in the first list of streets in towns having more than 100,000 inhabitants, this search may require more than 1 minute in state of the art navigation systems. For example, the list of streets for the city of Berlin contains approximately 8,000 entries. Therefore, for the search for street names in large cities it is also advantageous to use further lists of streets which are sorted in conformity with a frequency criterion or an empirical criterion. Therefore, the CD-ROM 7 contains at least one second list of streets with frequently searched streets for various large cities having a population of, for example more than 100,000. The search for street names in large cities can be performed analogously to the described search for a location name. During the first two steps, two sub-sets of the second list of streets of frequently searched street names are searched. During a third step, the search for the street name is aided by additional questions. For example, the user is requested to spell the initial letters of the street name searched.

A dialog for determining the street name of the destination point may be, for example as follows:
1. announcement: "which street?"
2. user: "<street name >" (for example, "Lenaustraße")
3. announcement "are you going to <street name from first sub-set of the second list of streets>?"
4. user:
   a) "yes" [end]
   b) "no" [to point 5]
5. announcement: "are you going to one of the indicated streets? If so, indicate the corresponding number."
6. user:
   a) "<number 1 . . . 8>" [end]
   b) "No" [to point 7]
7. announcement "please spell the beginning of the street name."
8. user: "<some initial letters of the street name>"
9. announcement: "data base is being searched."
10. announcement "if you stated one of the indicated streets, please indicate the relevant number".
11I. user: "<number>|none"
   [a) If <number>, then: end]
   [b) If "none", then: point 12]
12. announcement: "Such a street was not found."

The above dialog commences with the question from the navigation system in which street the destination point is situated (point 1). The user would like to go, for example to the "Lenaustraße" in the location "München". After the user has answered, for example "Lenaustraße" (point 2), the control device 1 searches for this street name in the first sub-set of the second list of streets. The recognized spoken street name is then mapped on the most similar street name of the first sub-set. After the search in the first sub-set of the second list of streets, for example the street name "Leopoldstraße" is output because the two street names "Lenaustraße" and "Leopoldstraße" sound most similar. When the street name found corresponds to the street name searched, the user will answer "yes" (point 4a) and the control device 1 terminates the search. In the other case (point 4b), the user answers "no". As for the above search for the location name, the search during the first step is performed in real time.

The control device 1 searches in a second sub-set of street names during a second step. This search can be started already during the time in which the most similar street name is output to the user after the search in the first step and in which the user confirms or rejects this street name.

The result of the second step usually consists of a plurality of street names which are displayed, for example on the display device 14, together with numbers. These street names of the second sub-set of the second list of streets are most similar to the street name searched. For example, the following street names could be displayed:
  1) Lenbachplatz
  2) Leonrodstraße
  3) Lerchenauer Straße
  4) Lenggrieser Straße The user is requested to state the number at which the street name searched is listed (point 5). If the street name searched is listed, the user states the relevant number and the search is terminated (point 6a). If the user answers "no" (point 6b), the user is requested to state some initial letters of the street name searched (point 7). The user then spells initial letters of the street name searched (point 8). After spelling, the user is informed that the data base is being searched (point 9).

The control device 1 searches the first list of streets with or after the entry of the letters. As has already been described for the search of the location name, for example the control device 1 uses the recognized letters and their recognition alternatives so as to make a preselection from the first list of streets. This preselection of street names is applied to the speech recognition device 13 which can take a decision on the basis thereof. The street names determined by the speech recognition device 13 are provided with a number and displayed on the display device 14. A list of this kind could have the following appearance:
  1) Lemckestraße
  2) Lena-Christ-Straße
  3) Lenaustraße
  4) Lengmoosstraße
  5) Lentnerweg Subsequently, the user can characterize the street searched by stating the indicated number (point 11), thus terminating the search. For example, the user enters the number 3 for the street name "Lenaustraße". However, should the user not indicate a number, the navigation system will state that no relevant street has been found. This is the case, for example when the street searched does not exist or is not contained in the relevant list of streets stored on the CD-ROM 7.

Third lists of locations or streets can be used so as to find a location or street name. The above steps can be replaced by other steps which utilize the third lists of locations or streets. The input of location or street names can thus also be made more reliable and faster.

For example, for names of locations or streets third lists with frequently used word segments can be stored on the CD-ROM 7 or in a memory of the speech recognition device 13. A second list of streets may contain, for example street names including the frequently used suffix " . . . straße". Third lists of streets may contain street names having the suffixes " . . . weg" or " . . . gasse". Analogously, for location names third lists of locations may be stored on the CD-ROM 7, which third lists contain location names having the prefixes "Ober . . . ", "Unter . . . ", "Nieder . . . ", "Groß . . . " etc. It is also possible to store third lists of locations with location names having the suffixes " . . . burg", " . . . berg", " . . . stadt", " . . . dorf" etc.

Using the third lists of locations and streets, during the third step the navigation system can ask the user a question instead of requesting spelling, said question being, for example:
  "does the street name end with" . . . platz"?" or
  "does the location name start with"Ober . . . "?".

These questions enable a substantial reduction of the number of location or street names to be searched.

Third lists of locations and/or streets may be sorted in conformity with the number of syllables. For example, at the start of the relevant third list of locations and/or streets the monosyllable location and street names are stated, followed by the two-syllable and multi-syllable names.

The third list of locations and/or streets can be permanently or temporarily stored in a memory of the speech recognition device 13. Such a memory is then considered as belonging to the data source arrangement 3. A temporary list of locations and/or streets is produced, for example during an ongoing input operation in that the first list of locations or streets is searched, sorted and stored in a memory of the speech recognition device 13 by the control device. The speech recognition device according to the state of the art, such as the speech recognition device 13, can quite reliably distinguish vowels and consonants from one another during the recognition, and hence estimate the number of syllables of the location or street name. During the third step, the navigation system can then ask the additional question:

"the location name stated has 2 syllables?" Answering this question reduces the number of names to be searched.

The CD-ROM 7, or a memory of the speech recognition device 13, may also store other third lists of locations or streets which are sorted according to given properties of a location or street name. Various location or street names may consist of one or more words and a hyphen may be present between several words of a location or street name. For example, the street "Tulpenweg" consists of one word whereas the street "Frankfurter Ring" consists of two words and the street "Konrad-Adenauer-Ring" consists of three hyphenated words. The number of names to be searched can be significantly reduced by making the navigation system ask the user for such a property, for example:

"Is the street name written as one word, is it hyphenated or written as separate words"

The relevant lists of locations and streets may contain names in an orthographic notation (correct spelling) or in a phonetic notation. The speech recognition device 13 is arranged in such a manner that it can compare the spoken names with names on a list of locations or streets which are stored on the CD-ROM 7 in an orthographic or a phonetic notation.

I claim:

1. An input system for at least location and/or street names, including
   an input device,
   a data source arrangement which contains at least one list of locations and/or streets, and
   a control device which is arranged to search location or street names, entered via the input device, in a list of locations or streets in the data source arrangement, characterized in that
   the at least one list comprises
      a first list of locations and/or streets with alphabetically sorted names of locations and/or streets,
      at least one second list of locations and/or streets with names of locations and/or streets sorted on the basis of a frequency criterion, the second list comprising at least a part of the names of locations and/or streets of the first list,
   the input device comprises a speech input system which is arranged to conduct entries in speech to the control device, and
   the control device is arranged to conduct first a sequential search for a name of a location or a street received from the input device, the search being from a beginning of the second list.

2. An input system as claimed in claim 1, characterized in that the frequency criterion is a number of inhabitants at a respective street or location.

3. An input system as claimed in claim 1, characterized in that, the control device is arranged to
   conduct the sequential search in a first sub-set of the second list of locations or streets and
   to output that location or street name contained in the first sub-set that is most similar to the name, the first sub-set comprising the location or street names stated at the beginning of the second list, a number of location or street names contained in the first sub-set being such that a search takes place practically in real time.

4. An input system as claimed in claim 3, characterized in that,
   the control device is arranged to
      search a location or street name in a second sub-set of the second list, when the location or street name searched is not contained in the first sub-set and
      output at least one location or street name that is most similar to the name, and
   the second sub-set comprises at least a part of the location or street names of the second list minus the location or street names of the first sub-set.

5. An input system as claimed in claim 4, characterized in that, the control device is arranged to perform the following operations, responsive to the name not being present in the second sub-set
   preselecting, responsive to spoken input of given letters of the name, a number of location or street names from the first list and
   comparing the name with the preselected number of location or street names.

6. An input system as claimed in claim 5, characterized in that
   the control device is arranged to start a further search operation after a search operation in the first or the second list and during a subsequent dialog with a user.

7. An input system as claimed in claim 4, characterized in that
   the control device is arranged to perform a sequential searching operation for the name responsive to the name not being present in the second sub-set of the second list, the sequential searching operation being from a beginning of a third list of locations or streets, which third list is sorted in conformity with a frequency criterion other than the frequency criterion used for the second list.

8. A navigation system comprising the input system of claim 1.

9. An input system as claimed in claim 1, characterized in that
   the frequency criterion used for the second list is an empirically determined search frequency for the locations or streets.

10. The input system as claimed in claim 1, characterized in that
    the frequency criterion used for the second list is a property of the name.

11. The input system as claimed in claim 10, wherein the property is a suffix or a prefix.

12. The input system as claimed in claim 10, wherein the property is a number of syllables in the name.

* * * * *